INVENTOR.
HAROLD E. SCHULTZE
BY
ATTORNEY

United States Patent Office 2,848,261
Patented Aug. 19, 1958

2,848,261

ROD SEAL FOR A SHOCK ABSORBER

Harold E. Schultze, Dayton, Ohio, assignor to General Motors Corporation, Detroit, Mich., a corporation of Delaware Application July 13, 1955, Serial No. 521,773

4 Claims. (Cl. 288—19)

This invention relates to improvements in sealing structures for encircling the rod of a shock absorber to prevent loss of fluid from the shock absorber around the rod during its reciprocating action.

It is common practice in shock absorbers of the direct acting type that have a rod extending from one end of the shock absorber to place a resilient seal member around the rod at the point of its entry into the shock absorber. These resilient seal members are retained under compression by the use of a compression spring that is normally disposed between the resilient seal member and the rod guide that reciprocably receives the rod. The compression spring places sufficient pressure on the resilient seal member to hold it in frictional engagement with the walls of the seal chamber and with the rod to prevent loss of hydraulic fluid from the shock absorber.

It is an object of this invention to provide a rod seal in which the conventional compression spring is eliminated.

It is another object of the invention to provide a resilient seal member in the form of a resilient rubber-like ring for placement within a seal chamber in engagement with the walls of the seal member and with the rod that passes through the center of the ring, the seal member being provided with a plurality of projections or protrusions that extend axially from one transverse wall of the seal member into compressive engagement with an end wall of the seal chamber whereby the compression of the projections effect axial compression of the body of the seal member to retain it in engagement with the walls of the seal chamber and with the rod.

It is another object of the invention to provide a seal member in accordance with the foregoing object wherein the compression of the projections provided on the seal member can be changed by means of an axially movable spacer member to change the frictional engagement of the body of the seal member with the walls of the seal chamber and the rod.

Further objects and advantages of the present invention will be apparent from the following description, reference being had to the accompanying drawings wherein a preferred form of the invention is clearly shown.

Figures 1, 2, 3:
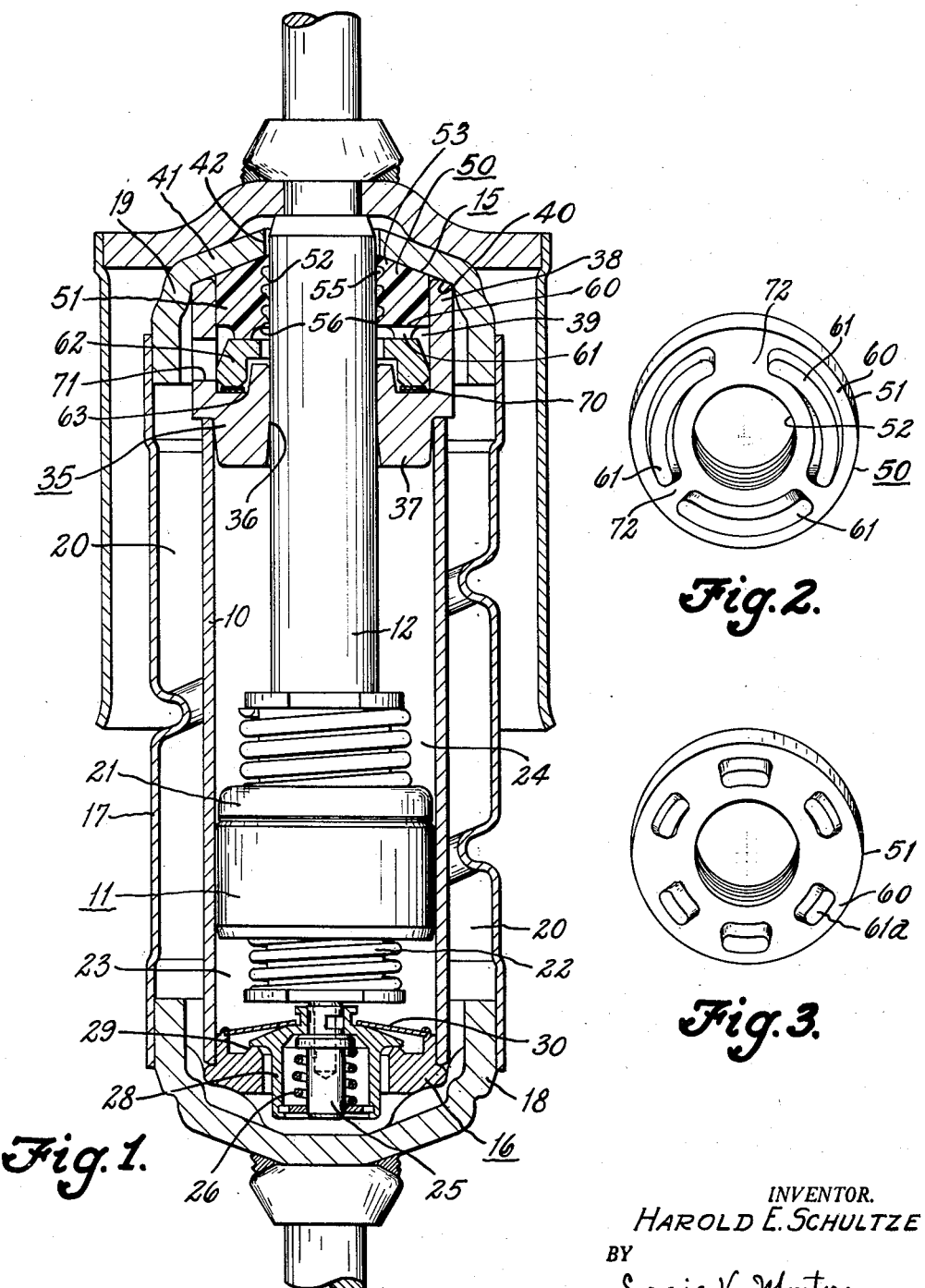
Figure 1 is a vertical cross sectional view of a shock absorber incorporating the rod seal of this invention.
Figure 2 is a perspective elevational view of the resilient rod seal of Figure 1.
Figure 3 is a perspective elevational view of a modified arrangement of the rod seal.

The shock absorber illustrated in Fig. 1 is of the direct acting type that includes an inner working cylinder 10 in which a piston 11 is slidably disposed for reciprocation in the cylinder 10. The piston 11 is carried on the lower end of an operating rod 12 that projects from the shock absorber and is adapted for connection to either the sprung or unsprung structure of a motor vehicle.

The cylinder 10 has the upper end closed by a rod seal structure 15 more fully described hereinafter. The opposite end of the cylinder 10 is closed by a base valve structure 16 that provides for flow of hydraulic fluid to and from the chamber between the base valve 16 and the piston 11.

The cylinder 10 is encircled by a second cylindrical shell 17 that is secured to a closure member 18 at the base valve end of the cylinder 10. The opposite end of the shell 17 is secured to a closure member 19 disposed at the rod seal end of the shock absorber.

The chamber 20 between the cylinder 10 and the shell 17 forms a fluid reservoir for hydraulic shock absorber fluid.

The piston 11 of the shock absorber is provided with a valve mechanism 21 on one side of the piston and a valve mechanism 22 on the opposite side thereof to provide for flow of hydraulic fluid through the piston between the chambers 23 and 24 upon reciprocation of the piston in the cylinder 10, the valve mechanisms 21 and 22 controlling the flow of fluid under pressure to absorb and dissipate energy in the well-known manner.

Since the rod 12 creates a situation of variable volume displacement between the chambers 24 and 23, the base valve structure 16 has an inner valve member 25 that is controlled by the spring 26 to regulate flow of fluid from the chamber 23 into the reservoir chamber 20 upon movement of the piston 11 toward the base valve 16. The base valve 16 also has a second valve member 28 that is held on its seat 29 by the fingered spring member 30 to provide for a substantially free flow of fluid from the reservoir chamber 20 into the chamber 23 on movement of the piston 11 away from the base valve structure 16.

The operation of the valve mechanisms 21 and 22 and of the base valve mechanism 16 is conventional and well-known, hence further description of these mechanisms is not believed necessary.

The rod 12 passes through a rod guide member 35 that has a central aperture 36 slidably receiving the rod 12. The rod guide 35 is retained on the upper end of the cylinder 10 by the projection portion 37 that extends within the cylinder 10.

The rod guide 35 is also provided with an axially extending wall 38 that is coaxial with the aperture 36, the wall 38 forming an open ended seal chamber 39 adapted to receive a resilient rod seal hereinafter described. The closure member 19 on the upper end of the shell 17 is supported on the upper end 40 of the coaxial wall 38 whereby the closure member 19 forms one end wall of the seal chamber 39. The wall portion 41 of the closure member 19 is in the form of a truncated cone and has an aperture 42 coaxial with the aperture 36 in the rod guide 35 and through which the rod 12 extends.

A rod seal 50 is positioned in the seal chamber 39. This seal 50 comprises an annular ring shaped body 51 that has a central aperture 52 adapted to slidably receive the rod 12. The upper end 53 of the body 51 is in the form of a truncated cone to engage the end wall 41 of the seal chamber 39. The inner periphery of the ring shaped body 51 engages the rod 12 while the outer periphery of the body 51 engages the coaxial wall 38 of the rod guide 35.

The coaxial aperture 52 of the seal 50 is provided with a plurality of grooves 55 that are separated by rod contacting portions 56, the specific form and shape of the grooves 55 and the rod engaging portions 56 being more fully disclosed and described in the patent to Funkhouser et al. 2,643,147 dated June 23, 1953.

The lower radial wall 60 of the seal body 51 is provided with a plurality of axially extending projections 61 that are integral with the body 51 and preferably of the same composition as the resilient body 51. Preferably, the body is composed of a rubber or rubber-like material that is resilient and compressible and is resistant to the usual oils used in hydraulic shock absorbers. Thus, the projections 61 are resilient and compressible. The axially extending projections 61 engaging spacer ring 62 between the seal 50 and the spacer ring 62 are retained under compression by the spacer ring.

The resiliency of the projections 61 allow for compression thereof to cause the projections 61 to apply compression pressure to the body 51 of the seal 50 to thereby retain the body in engagement with the walls 38 and 41 of the seal chamber 39 and retain the seal engaging portions 56 of the rod aperture 52 in engagement with the surface of the rod 12 whereby to prevent loss of fluid along the rod and from the seal chamber.

To increase the compression of the resilient projections 61, and to take care of manufacturing tolerances of the seal 50, shim rings 70 are disposable between the spacer ring 62 and the bottom wall 63 of the seal chamber 39 whereby to move the spacer ring 62 axially toward the wall 41 of the seal chamber 39 to reduce the dimensional tolerances between the wall 41 and the spacer ring 62 which thereby confines the seal 50 within a smaller space and increases the compression of the projections 61 to retain the seal body 51 more firmly in engagement with the walls of the seal chamber 39 and with the rod 12.

While it has been mentioned herein that the projections 61 are composed of the same composition of the body 51 of the seal 50, yet it is entirely within the scope of this invention to have the projections 61 made of a resilient composition different from the body 51 of the seal to either increase or decrease the pressure applied by the projections 61 to the body 51 of the seal. This can be readily controlled by the durometer hardness of the projections 61.

The coaxial wall 38 is provided with an opening 71 that connects with the reservoir chamber 20 to allow fluid collecting in the seal chamber 39 to return to the reservoir chamber 20.

As shown in Figure 2 the projections 61 are in the form of arcuate segments disposed in coaxial circular arrangement. Each of the segments is spaced from the adjacent segments to provide a space 72 between the ends of adjacent segments through which fluid can pass from the surface of the rod 12 into the seal chamber 39 and thence return to the reservoir chamber 20 through the opening 71.

It has heretofore been mentioned that the compressibility of the projections 61 can be varied by changing the hardness or softness of the projections relative to the body 51 of the seal, and thereby provide for varying the pressure applied upon the body 51 to retain it in sealing engagement with the seal chamber walls 38 and 41 and with the rod 12. The pressure applied to the body 51 of the seal can also be varied by changing the number of projections 61a that extend from the radial wall 60 of the body 51 of the seal, as shown in Fig. 3, the greater number of smaller projections effecting a lesser compressive force on the body of the seal.

While the form of embodiment of the invention as herein disclosed constitutes a preferred form, it is to be understood that other forms might be adopted as may come within the scope of the claims which follow.

What is claimed is as follows:

1. A rod seal for a shock absorber, including in the combination, a rod seal member, a rod guide member having a wall provided with a central aperture adapted slidably to receive a rod and having a coaxial wall extending from the apertured wall at one side of the aperture forming an open ended chamber adapted to receive said rod seal member, a closure member on the said coaxial wall closing the open end of said chamber and having an aperture coaxial with the first mentioned aperture and through which a rod extends, a rod disposed in said aperture, and said rod seal member disposed in said chamber and comprising a ring shaped body of resilient material having one end surface engaging one end wall of said chamber and the inner and outer peripheries engaging said rod and said coaxial wall respectively, the opposite end surface of said seal member having a plurality of integral axially extending resilient projections retained by the opposite end wall of said chamber compressably to effect thereby resilient retention of said body in engagement with said rod, said coaxial wall and the said one end wall of the said chamber.

2. A rod seal for a shock absorber constructed in accordance with claim 1 in which the said axially extending resilient projections on the body of said seal member are disposed in coaxial circular arrangement.

3. A rod seal for a shock absorber constructed in accordance with claim 1 in which the plurality of axially extending resilient projections on the body of the seal member consist of individual arcuate segments disposed in coaxial circular arrangement.

4. A rod seal for a shock absorber, including in the combination, a rod seal member, a rod guide member having a wall provided with a central aperture adapted slidably to receive a rod and having a coaxial wall extending from the apertured wall at one side of the aperture forming an open ended chamber adapted to receive said rod seal member, a closure member on the said coaxial wall closing the open end of said chamber and having an aperture coaxial with the first mentioned aperture and through which a rod extends, a rod disposed in said aperture, and said rod seal member disposed in said chamber and comprising a ring-shaped body of resilient material having one end surface engaging one end wall of said chamber and the inner and outer peripheries engaging said rod and said coaxial wall respectively, the opposite end surface of said seal member having integral resilient means retained by the opposite end wall of said chamber, said means compressably to effect thereby resilient retention of said body in engagement with said rod, said coaxial wall and the said one end wall of the said chamber.

References Cited in the file of this patent

UNITED STATES PATENTS

| 794,539 | O'Brien | July 11, 1905 |
| 917,333 | Marlin | Apr. 6, 1909 |
| 2,643,147 | Funkhouser et al. | June 23, 1953 |
| 2,717,058 | Brundrett | Sept. 6, 1955 |

FOREIGN PATENTS

| 709,338 | Great Britain | May 19, 1954 |